(12) United States Patent
Peabody et al.

(10) Patent No.: US 9,200,753 B2
(45) Date of Patent: Dec. 1, 2015

(54) FLOW DIVERTER VALVE AND METHOD

(75) Inventors: Tarah L. Peabody, Elyria, OH (US); Attila Naszek, Budapest (HU)

(73) Assignee: Bendix Commercial Vehicle Systems LLC, Elyria, OH (US)

( * ) Notice: Subject to any disclaimer, the term of this patent is extended or adjusted under 35 U.S.C. 154(b) by 422 days.

(21) Appl. No.: 13/564,777

(22) Filed: Aug. 2, 2012

(65) Prior Publication Data
US 2014/0034131 A1  Feb. 6, 2014

(51) Int. Cl.
*F17D 3/00*  (2006.01)

(52) U.S. Cl.
CPC .............. *F17D 3/00* (2013.01); *Y10T 137/0318* (2015.04); *Y10T 137/85938* (2015.04)

(58) Field of Classification Search
CPC .............. F17D 3/00; Y10T 137/85938; Y10T 137/0318
USPC .................... 137/310, 315.16, 511, 528, 533; 251/310, 315.16; 303/118.1
See application file for complete search history.

(56) References Cited

U.S. PATENT DOCUMENTS

| | | | |
|---|---|---|---|
| 219,754 A * | 9/1879 | Newman | 417/511 |
| 774,732 A * | 11/1904 | Baines | 137/533.17 |
| 866,132 A * | 9/1907 | Henderson | 137/533.17 |
| 912,706 A * | 2/1909 | Mattingly | 137/533.17 |
| 2,706,487 A * | 4/1955 | Wilson | 137/102 |
| 4,858,638 A * | 8/1989 | Cseri | B60T 17/04 137/115.13 |
| 4,886,085 A * | 12/1989 | Miller | 137/1 |
| 5,918,852 A | 7/1999 | Otto | |
| 7,255,122 B2 * | 8/2007 | Ho et al. | 137/102 |
| 2008/0142092 A1 * | 6/2008 | Bai | 137/511 |

OTHER PUBLICATIONS

BW2085, Bendix Commercial Vehicle Systems LLC, Bendix M-30 Antilock Modulator Assembly, Sep. 2004, 8 pages, Published in U.S.A.

* cited by examiner

*Primary Examiner* — Kevin Murphy
*Assistant Examiner* — Daphne M Barry
(74) *Attorney, Agent, or Firm* — Cheryl L. Greenly; Brjan E. Kondas; Engene E. Clair

(57) ABSTRACT

Various embodiments of a flow diverter, a valve and a method of controlling air flow in the valve are disclosed. The flow diverter has a cylindrical body, a plurality of circumferentially spaced apart longitudinal members, an open end portion, a closed end portion and a raised element extending outwardly from the closed end portion. The flow diverter is disposed in a cavity in the valve. The cavity is in communication with a supply passage, an exhaust passage and a delivery passage. Air passes through the flow diverter to the delivery passage when the flow diverter is in a delivery position. Air moves the flow diverter from the delivery position to an exhaust position when air pressure in the delivery passage is greater than air pressure in the supply passage. The flow diverter restricts air from passing from the delivery passage to the supply passage when in the exhaust position.

20 Claims, 5 Drawing Sheets

FLOW DIVERTER VALVE AND METHOD

BACKGROUND

The present invention relates to an air brake valve used in an anti-lock brake system for commercial vehicles. In particular, this invention relates to electro-pneumatic air brake valves, also known as modulators. A modulator is capable of applying and releasing the air pressure at the wheel end to mitigate wheel lock up during an anti-lock braking event.

Commercial vehicles equipped with air brakes must meet the release timing requirements of Federal Motor Vehicle Safety Standard (FMVSS) 121 for Air Brake Systems. The release timing requirements relate to how quickly the brakes release after the brake pedal is allowed to return to its normal position. A modulator must be able to quickly exhaust the air pressure after an anti-lock braking event in order to meet the timing requirements.

SUMMARY

Various embodiments of a flow diverter are disclosed. In one embodiment, the flow diverter comprises a generally cylindrical body having a central longitudinal axis and a plurality of longitudinal members circumferentially spaced apart. The flow diverter has an open end portion of the cylindrical body and a closed end portion of the cylindrical body. A raised element extends from an outer surface of the closed end portion. In another embodiment, the raised element has a top surface having an area that is less than the area of the outer surface of the cylindrical body at the closed end.

Various embodiments of a valve including a flow diverter are disclosed. In one embodiment, the valve body includes a cavity having a diameter in communication with a supply passage, an exhaust passage and a delivery passage. A flow diverter is disposed in the cavity and moves between a delivery position and an exhaust position. The flow diverter comprises a generally cylindrical body and a number of longitudinal members circumferentially spaced apart. The flow diverter has an open end portion of the cylindrical body and a closed end portion of the cylindrical body and a raised element that extends from an outer surface of the closed end portion.

Various methods for controlling air through a valve that includes a flow diverter are disclosed. One method of controlling air flow in a brake valve comprises passing air through a delivery passage of the brake valve and into contact with a raised element of the flow diverter positioned within a cavity of the valve; and passing air through an exhaust passage of the brake valve. The flow diverter is moved toward an exhaust position within a cavity of the brake valve when the pressure at the delivery passage is greater than the pressure at the supply passage. In another embodiment, when the air pressure at the supply passage is greater than the air pressure at the delivery passage, the air passes against a recessed wall of the flow diverter and the flow diverter is moved toward a delivery position and air passes through a delivery passage of the valve.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION

The various embodiments of the present invention described herein relate to a flow diverter, a brake valve, and method of controlling air flow in an air brake valve for an anti-lock brake system for commercial vehicles, although it should be understood that alternative valves and applications of valves besides air brake valves are contemplated. In one embodiment, this invention relates to electro-pneumatic air brake valves, also known as modulators. A modulator is capable of applying and releasing the air pressure at the wheel end to mitigate wheel lock up during an anti-lock braking event.

Figure 1A:
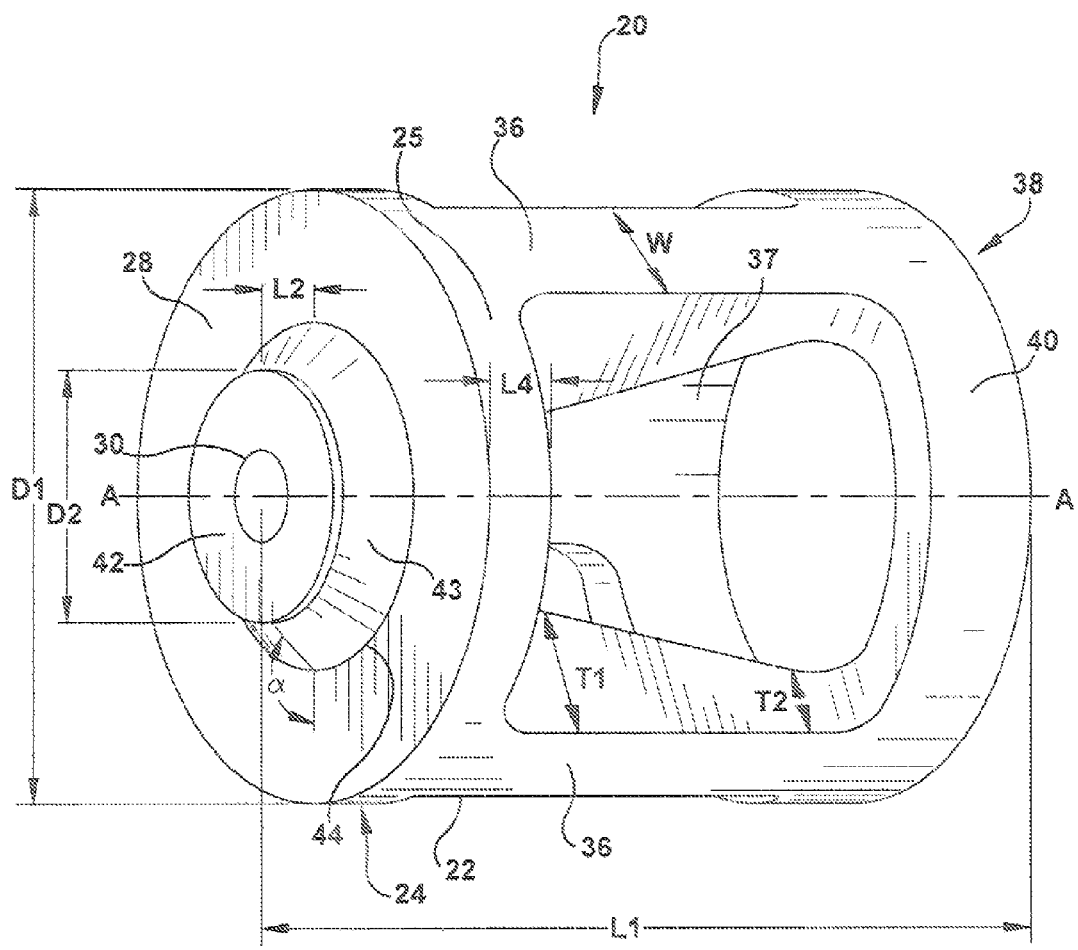
FIG. 1A illustrates a perspective view of a flow diverter, according to an embodiment of the present invention.

With reference to FIG. 1A, a view of a flow diverter 20 from a closed end according to an embodiment of the present invention is shown. The flow diverter 20 comprises a generally cylindrical body 22 having a central longitudinal axis A, a length L1 and a diameter D1. The flow diverter 20 includes a closed end portion 24 and an open end portion 38.

The flow diverter 20 includes a plurality of longitudinal members 36 circumferentially spaced apart about the cylindrical body 22 between the open end portion 38 and the closed end portion 24. An opening 37 is between each of the plurality of longitudinal members 36. The perimeter of each opening 37 is substantially rectangular, but other shapes including, but not limited to, circular and square shapes are contemplated. Three longitudinal members are shown in this embodiment, but a number of longitudinal members greater than one are contemplated. In the example embodiment shown, each of the plurality of longitudinal members 36 has the same width W, although in alternative embodiments the width can vary. The thickness of the each of the plurality of longitudinal members can also be equal or vary in thickness. FIG. 1A shows that each of the plurality of longitudinal members 36 has a thickness T1 at the closed end portion 24 and a thickness T2 at the open end portion 38. In one embodiment, the thickness T1 is greater than the thickness T2. The larger thickness T1 of the longitudinal members 36 at the closed end portion 24 improves the impact resistance of the flow diverter 20 during movement, as will be discussed with respect to the valve.

The cylindrical body 22 of flow diverter 20 at the closed end portion 24 has a base wall 25 and an inner surface 26 (not shown) and an outer surface 28. A raised element 30 extends outwardly from the outer surface 28 of the closed end portion 24. In one embodiment, the raised element 30 is a generally frustoconical shape having a top surface 42, a raised wall 43 and a base 44. The base 44 can be separate from the outer surface 28 of the cylindrical body 22. In another embodiment the base 44 is integral with the outer surface 28 of the cylindrical body 22. In the example embodiment shown in FIG. 1A, the diameter D2 of the top surface 42 of the raised element 30 is less than the diameter of the base 44 of the raised element 30. The diameter D2 of the top surface 42 is also less than the diameter D1 of the outer surface 28 of the cylindrical body 22.

In another embodiment, the raised element 30 has a top surface 42 that is a substantially circular shape, as shown in FIG. 1A. In this embodiment, the diameter D2 of the top surface 42 of the raised element 30 is less than the diameter D1 of the outer surface 28 of the cylindrical body at the closed end portion 24. In one embodiment, the diameter D2 ranges from about 40% to about 60% of the diameter D1. In another embodiment, the diameter D2 is about 45% to about 55% of the diameter D1. In another embodiment, the top surface 42 of the raised element 30 has an area that is less than an area of the outer surface 28 of the cylindrical body 22 at the closed end portion 24 of the flow diverter 20. The surface area of the outer surface 28 of the cylinder body 22 at the closed end portion 24 includes the area of the outer surface 28 that is covered by the raised element 30. The surface area, for example the area of the top surface or base surface, of the raised element 30 can range from about 20% to about 60% of the area of the outer surface 28 of the cylindrical body 22 at the closed end portion 24. In another embodiment, the area of the raised element 30 is about 50% the area of the outer surface 28 of the closed end portion 24.

Figure 1B:
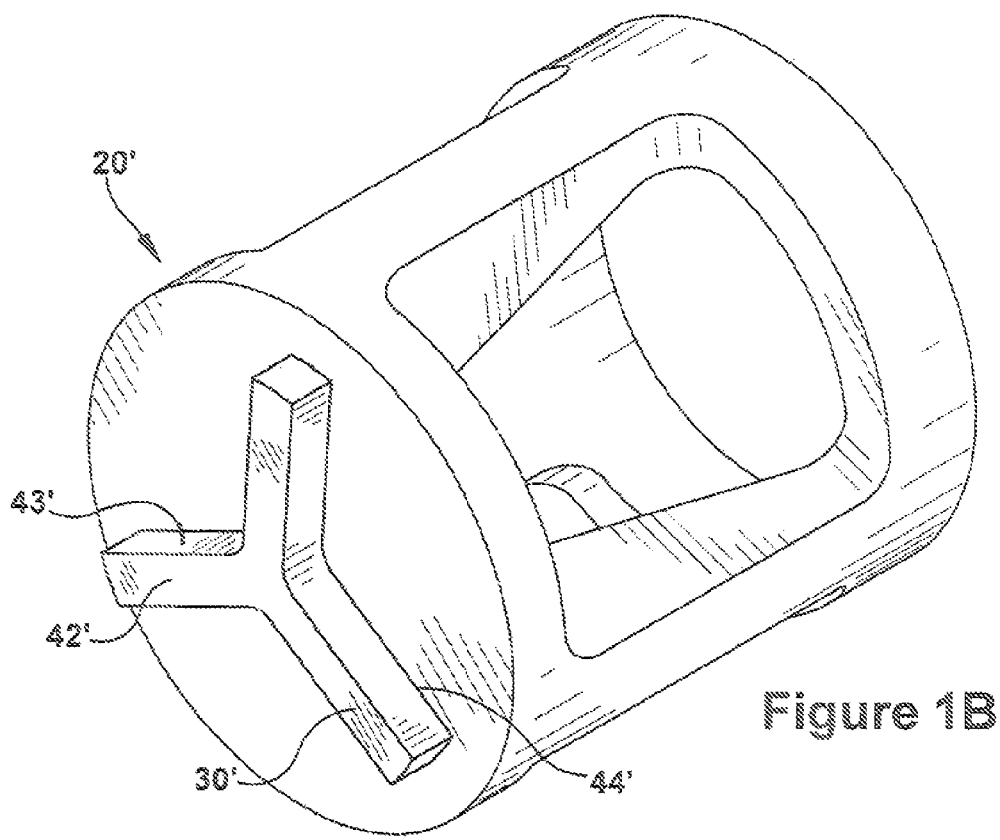
FIGS. 1B and 1C illustrate perspective views of the closed end of a flow diverter, according to alternative embodiments of the present invention.
Figure 1C:
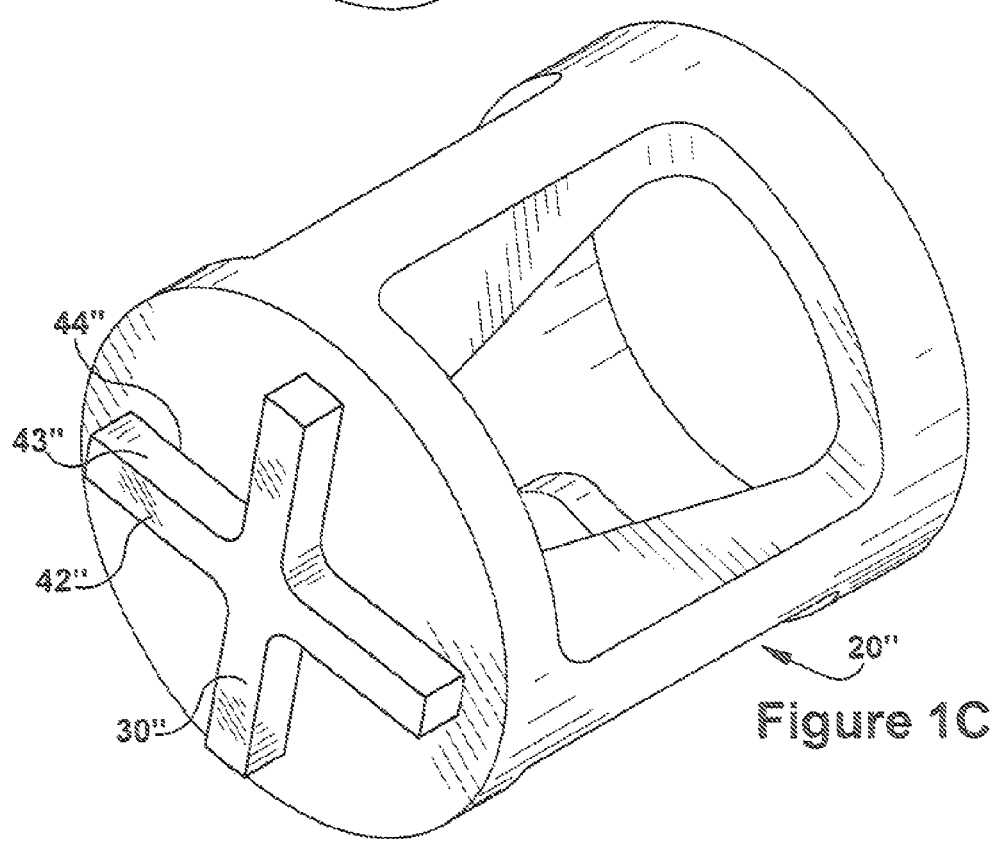

The raised element can have several shapes. For example, in another embodiment, FIG. 1B illustrates flow diverter 20' having a raised element 30' as substantially Y-shaped. The raised element 30' has a top surface 42', a raised wall 43' and a base 44'. In yet another embodiment shown in FIG. 1C, the raised element 30" is substantially X-shaped. The raised element 30" has a top surface 42", a raised wall 43" and a base 44".

The flow diverter 20 has an overall length L1 including the raised element 30, which has a length L2, a peripheral wall 40 at the open end portion 38, which has a length L3 and the base wall 25, which has a length L4. The length L2 of the raised element 30 ranges from about 1% to 50% of the length L1, in another embodiment from about 5% to about 20% of the overall length L1 of the flow diverter 20. In one embodiment, the length L2 of the raised element 30 is about 8% of the overall length L1 of the flow diverter 20. The percentage of the length L2 of the raised element 30 to the overall length L1 of the flow diverter 20 affects the surface area on which air can act, as will be discussed with respect to the valve.

The raised wall 43 of the raised element is oriented at an angle, alpha α, relative to the base 44. In one embodiment, the angle alpha of the raised wall 43 oriented with respect to the base 44 of the raised element 30 ranges from about 90 degrees to about 150 degrees. In another embodiment, the angle alpha ranges from about 130 degrees to about 140 degrees, and in another embodiment angle alpha is about 135 degrees. The angle alpha is chosen to improve the strength of the flow diverter 20 as well as the initiation of the movement of the flow diverter 20 in response to air flow, as will be discussed with respect to the valve.

Figure 2:
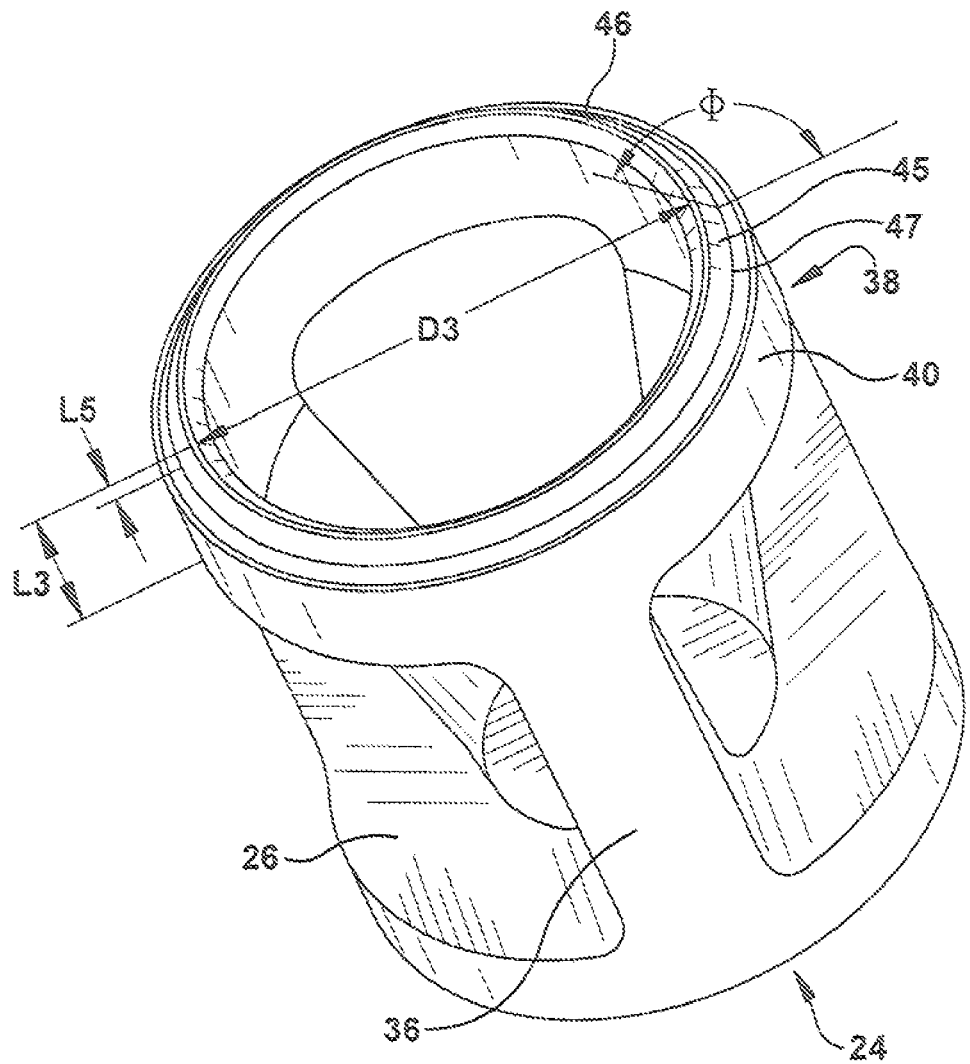
FIG. 2 illustrates another perspective view showing the open end of the flow diverter of FIG. 1, according to an embodiment of the present invention.

With reference to FIG. 2, a view of the flow diverter 20 from the open end is shown. The cylindrical body 22 of flow diverter 20 includes the peripheral wall 40 at the open end portion 38 having a length L3. The length L3 of the peripheral wall 40 ranges from about 1% to about 25% of the overall length L1 of the flow diverter 20. In another embodiment, the length L3 of the peripheral wall 40 is about 20% of the overall length of L1 of the flow diverter 20. In another embodiment, the flow diverter 20 further includes a recessed wall 45 that extends from an inwardly extending ledge 47 and terminates at edge 46 at the open end portion 38 of flow diverter 20. The diameter D3 of the flow diverter 20 at the recessed wall 45 is less than the diameter D1. The length L5 of the recessed wall 45 is about 10% of the overall length L1 of the flow diverter 20. In another embodiment, the length L5 is about 3% of the length L1. In another embodiment the recessed wall 45 is tapered.

The recessed wall 45 is oriented at an angle, phi φ, relative to the ledge 47 of the cylindrical body 22. The angle phi of the recessed wall 40 with respect to ledge 47 ranges from about 90 degrees to about 150 degrees. In another embodiment, the angle phi is about 120 degrees. The angle phi is chosen to improve the strength of the flow diverter 20 as well as the initiation of the movement of the flow diverter 20 in response to air flow, as will be discussed with respect to the valve.

The material of the flow diverter 20 can be made of polymer or metal or both. Polymers include, but are not limited to, thermoset polymers and thermoplastic polymers. Metals include, but are not limited to, aluminum, steel or zinc. In one embodiment the flow diverter 20 is made of or includes PEEK material. In another embodiment, the flow diverter 20 is made of or includes a glass filled nylon, such as Zytel®.

Therefore, in one embodiment of the present invention, the flow diverter comprises a generally cylindrical body having a plurality of longitudinal members circumferentially spaced apart with openings therebetween. The cylindrical body of the flow diverter has an open end portion and a closed end portion. The closed end portion has an inner surface and an outer surface and a raised element extending outwardly from the outer surface. In another embodiment, the raised element has a top surface with a diameter that is less than a diameter of the outer surface of the closed end portion.

Figure 3:
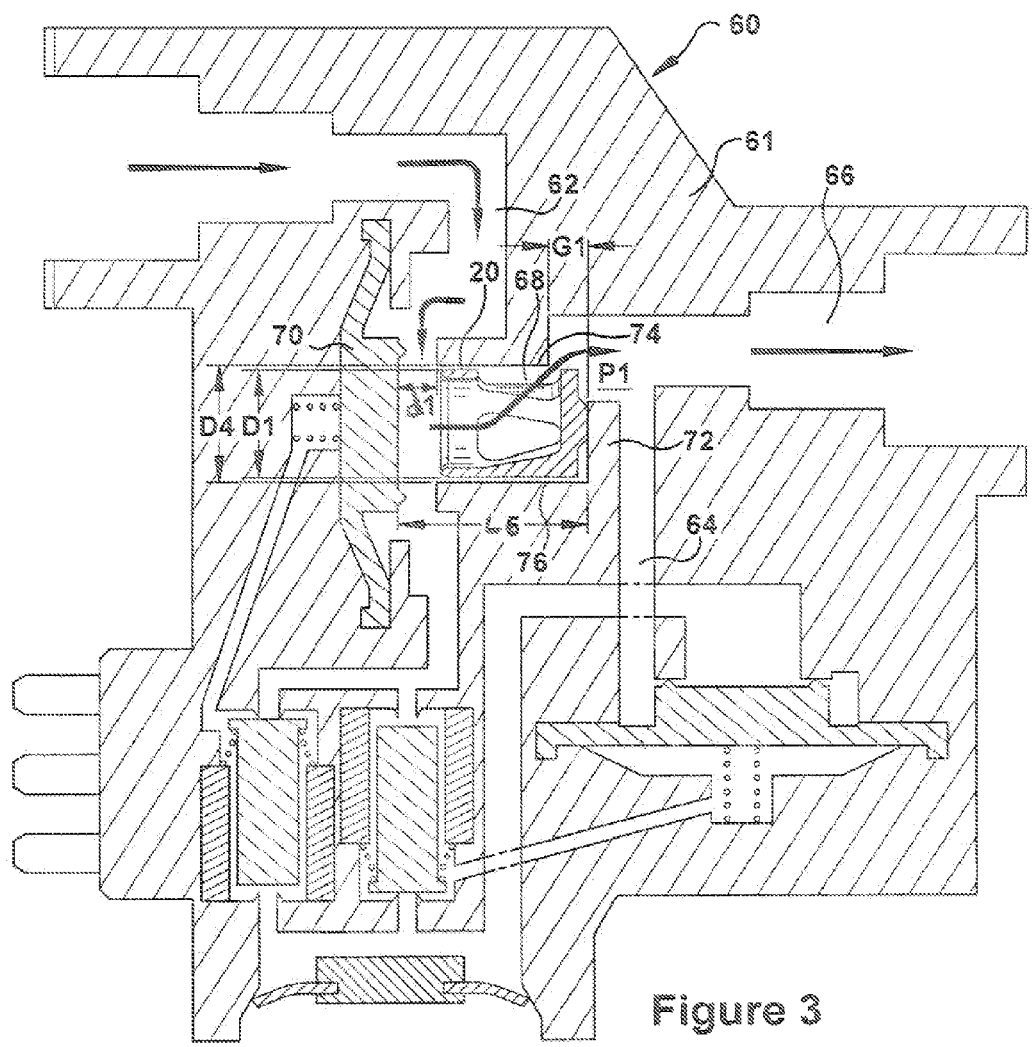
FIG. 3 illustrates a valve incorporating a flow diverter, according to an embodiment of the present invention.

FIG. 3 shows a cross-sectional view of a valve 60 that includes a body 61 and a cavity 68 in the body 61. The flow diverter 20 is shown in a delivery position P1 within the cavity 68. The cavity 68 has a length L5 and includes the available space for movement of the flow diverter 20 within the valve 60. The cavity 68 is in communication with a supply passage 62, an exhaust passage 64 and a delivery passage 66. The flow diverter 20 is disposed longitudinally in the cavity 68 between a diaphragm 70 and a retaining wall 72. The flow diverter 20 is disposed and bound laterally between valve sidewalls 74 and 76. The diameter D1 of the flow diverter 20 at the closed end portion 24 ranges from about 90% to about 99% of the diameter D4 of the cavity 68. In another embodiment, the diameter D1 of the flow diverter 20 is about 95% of the diameter D4 of the cavity 68. The overall length L1 of the flow diverter 20 ranges from about 70% to 99%, in another embodiment, from about 75% to about 85% of the length L5 of the cavity 68. The end of retaining wall 72 and sidewall 74 are separated by a gap, G1.

When the flow diverter 20 is in the delivery position P1, the supply passage 62 is in communication with the delivery passage 66 through cavity 68, the gap G1 and the flow diverter 20. The communication between the delivery passage 66 and the supply passage 62 is provided by the openings 37 between the longitudinal members 36 of the flow diverter 20. The raised element 30 of the flow diverter 20 is in contact with the retaining wall 72 when in a delivery position P1. The gap G1 between the retaining wall 72 and the sidewall 74 is greater than the sum of the length L2 of the raised element 30 and length L4 of the base wall 25 of the closed end portion 24 of the flow diverter 20. The flow diverter 20 is spaced a distance, d1, away from the diaphragm 70.

Figure 4:
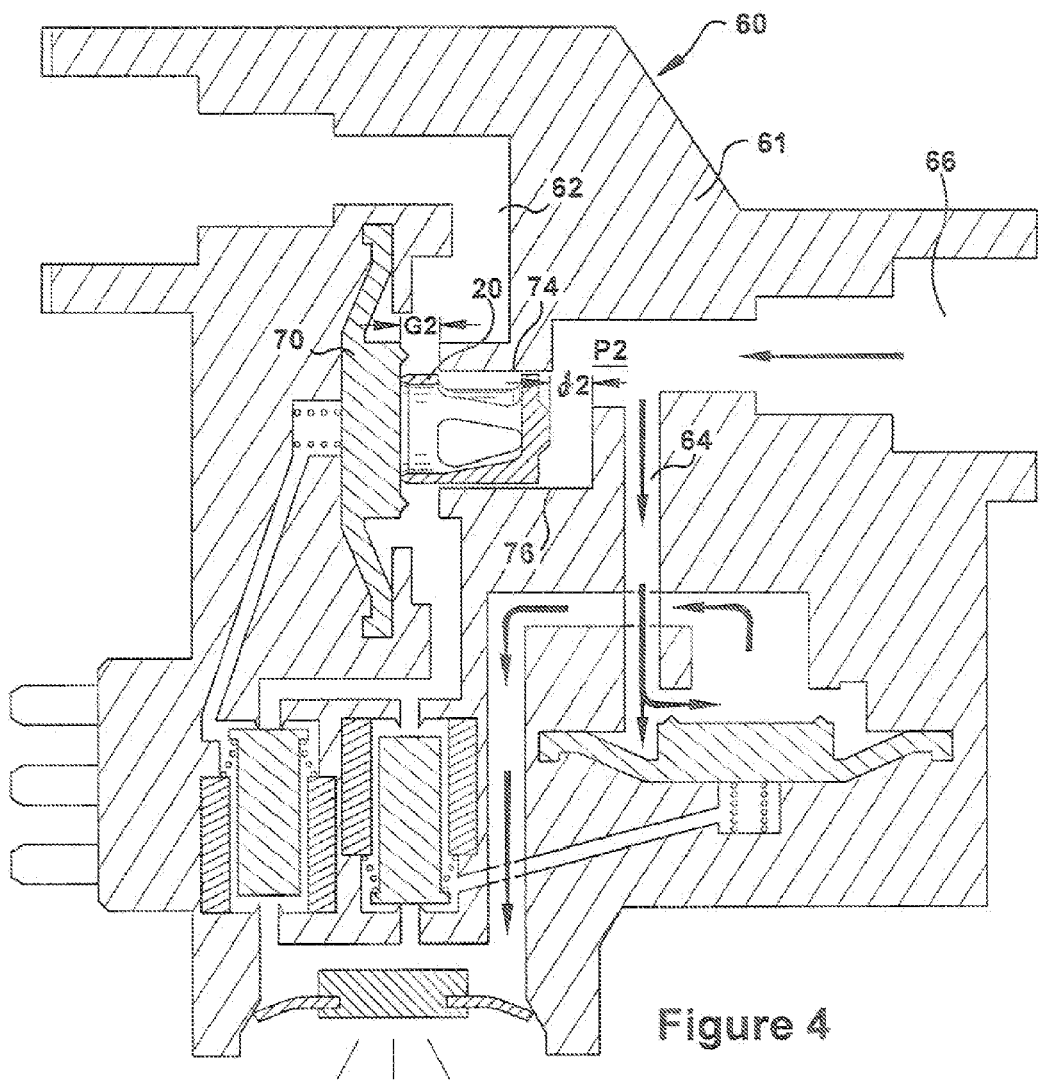
FIG. 4 illustrates a valve incorporating a flow diverter, according to an embodiment of the present invention.

FIG. 4 shows the valve 60 with the flow diverter 20 in an exhaust position P2. The flow diverter 20 moves from the delivery position P1 to the exhaust position P2 based on air pressure. The flow diverter 20 moves longitudinally along the cavity 68 from P1 to P2. The relatively small difference in dimensions between the diameter D1 of the flow diverter 20 and the diameter D4 of the cavity 68 minimizes lateral movement in the cavity 68 during the transition from P1 to P2. The difference between the overall length L1 of the flow diverter 20 to the length L6 of the cavity 68 minimizes the longitudinal motion of the flow diverter 20 during a transition from the delivery position P1 to the exhaust position P2. Due to the minimal movement of the flow diverter 20 in the cavity 68, no guidance members or bias members are added to facilitate the movement of the flow diverter 20 from the delivery position P1 to the exhaust position P2. Thus, further improvements in the speed of the flow diverter 20 in transitioning from the delivery position P1 to the exhaust position P2 can be realized in the embodiments described above.

When the flow diverter 20 is in the exhaust position P2, the recessed wall 45 of the open end portion 38 of the flow diverter 20 is in contact with the diaphragm 70. In the exhaust position P2, the flow diverter 20 restricts air flow from the supply passage 62 to the delivery passage 66. The closed end portion 24 of the flow diverter 20 diverts air flow from the delivery passage 66 to the exhaust passage 64 while the flow diverter 20 is in the exhaust position P2. The length L3 of the peripheral wall 40 of the open end portion 38 is greater than or equal to a gap G2 between the diaphragm 70 and the sidewalls 74, 76. The open end portion 38 of the flow diverter 20 therefore restricts air from flowing between the sidewalls 74, 76 and the diaphragm 70 to the supply passage 62. The flow diverter 20 is spaced a distance, d2, away from the retaining wall 72.

The material of the valve 60 can be made of a metal or a polymer or both. Polymer materials include, but are not limited to, thermoset polymers and thermoplastic polymers. Metals include, but are not limited to, aluminum, steel and zinc. In one embodiment, the valve 60 is aluminum. The material of the diaphragm 70 includes, but is not limited to, rubber and plastic.

Accordingly, a valve for an air brake system comprises a body, a cavity in the body in communication with a supply passage, an exhaust passage and a delivery passage. A flow diverter is disposed in the cavity, the flow diverter having a generally cylindrical body and a plurality of longitudinal members. The flow diverter is moved in response to air pressure to a delivery position in which air flows from the supply passage to the delivery passage. The flow diverter is moved in response to air pressure to an exhaust position in which air flows from the delivery passage to the exhaust passage and is restricted from flowing to the supply passage.

Air pressure in the valve 60 controls the position of the flow diverter 20. The air pressure acts on the inner surface 26 of the closed end portion 24 of the flow diverter 20 to maintain the flow diverter 20 in the delivery position P1 when the air pressure in the supply passage 62 is greater than the air pressure in the delivery passage 66. As shown by the arrows in FIG. 3, the air passes along the central longitudinal axis A of the flow diverter 20. The air then passes radially through the openings 37 between the plurality of longitudinal members 36 in the flow diverter 20 and through the gap G1 in the valve 60 to the delivery passage 66.

When the air pressure at the supply passage 62 is reduced to a pressure less than the pressure at the delivery passage 66, the air from the delivery passage 66 moves the flow diverter 20 to the exhaust position P2. The higher air pressure from the delivery passage 66 acts on the outer surface 28 of the closed end portion 24 and the raised element 30 of the flow diverter 20 to move the flow diverter 20 to the exhaust position P2. The diameter D1 of the flow diverter 20 at the closed end portion 24 affects the ability of the flow diverter 20 to move from the delivery position P1 to the exhaust position P2 in response to the air pressure change. The presence and shape of the raised element 30 improves the ability of the flow diverter 20 to move from the delivery position P1 to the exhaust position P2. The raised element 30 contributes to restricting the rotation of the flow diverter 20 in the cavity 68 when air is flowing across the closed end portion 24 of the flow diverter 20.

When the flow diverter 20 is in the exhaust position P2, the air flows from the delivery passage 66 to the exhaust passage 64, as shown by the arrows in FIG. 4. The air flow from the delivery passage 66 to the supply passage 62 is restricted because the edge 46 of the peripheral wall 40 seats on the diaphragm 70.

When the air pressure at the supply passage 62 increases to a pressure greater than the pressure at the delivery passage 66, the air from the supply passage 62 moves the flow diverter 20 to the delivery position P1. The higher air pressure from the supply passage 62 acts on the recessed wall 45 of the flow diverter 20 to move the flow diverter 20 to the delivery position P1. The presence of recessed wall 45 can affect the ability of the flow diverter 20 to move from the exhaust position P2 to the delivery position P1 as the recessed wall 45 and the ledge 47 present an increased surface area onto which the air passing from the supply passage 66 can act in order to move the flow diverter 20 away from the diaphragm 70.

The travel of the flow diverter 20 from the delivery position P1 to the exhaust position P2 in one embodiment is from about 1 mm and 5 mm. In another embodiment, the travel is about 3 mm. In another embodiment, the open end portion 38 of the flow diverter 20 is spaced a distance d1 of about 3 mm from the diaphragm 70 when in the delivery position P1. The raised element 30 of the flow diverter 20 is spaced a distance d2 of about 3 mm from the retaining wall 72 when in the exhaust position P2. The travel is selected so that the air flow through the cavity 68 and flow diverter 20 is increased while the speed of movement of the flow diverter 20 from the delivery position P1 to the exhaust position P2 is also increased.

The closeness of the diameter D1 and length L1 of the flow diverter 20 with respect to the size of the cavity 68 and the spacing between the diaphragm 70 and the retaining wall 72 improves durability of the flow diverter 20 during movement in the cavity 68. In an embodiment where the flow diverter 20 is a thermoset polymer and the valve 60 is aluminum, the greater thickness T1 of at least one of the longitudinal members 36 at the closed end portion 24 improves the impact resistance when the flow diverter 20 contacts the retaining wall 72.

Accordingly, a method of controlling air flow in a brake valve is disclosed. When the air pressure at the delivery passage is greater than the air pressure at the supply passage, the air is passed from a delivery passage against a raised element of a flow diverter. The flow diverter is moved to an exhaust position within the valve and restricts air flow to the supply passage. When the air pressure at the supply passage is greater than the air pressure at the delivery passage, the air passes against a recessed wall of an open end portion of the flow diverter. The flow diverter then moves to a delivery position.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described.

Accordingly, departures may be made from such details without departing from the spirit or scope of the applicant's general inventive concept.

We claim:

1. A valve for an air brake system comprising: a body; a cavity in the body having a diameter and in communication with a supply passage, an exhaust passage and a delivery passage; and a flow diverter disposed in the cavity, the flow diverter comprising: a generally cylindrical body having a longitudinal axis and a plurality of longitudinal members circumferentially spaced apart with openings therebetween; an open end portion of the cylindrical body, a recessed wall extending from a ledge of the cylindrical body at the open end portion wherein the ledge is between the recessed wall and the plurality of longitudinal members; and a closed end portion having a raised element extending outwardly therefrom.

2. The valve as in claim 1 wherein the flow diverter is disposed in the cavity between a diaphragm and a retaining wall.

3. The valve as in claim 2, wherein the flow diverter is in a delivery position, the closed end portion of the flow diverter is in contact with the retaining wall and the supply passage is in communication with the delivery passage.

4. The valve as in claim 3, wherein the flow diverter is in the delivery position and the flow diverter is spaced a distance away from the diaphragm.

5. The valve as in claim 2, wherein the flow diverter is in a delivery position and a longitudinal gap, (G1), between the retaining wall and a sidewall of the cavity is greater than the sum of the length of the raised element and the length of a base wall at the closed end portion of the flow diverter.

6. The valve as in claim 2 wherein the flow diverter is in an exhaust position and the recessed wall of the open end portion of the flow diverter is in contact with the diaphragm; wherein the ledge and the recessed wall are configured to present a surface area onto which air passing from the supply passage can act when the flow diverter is in contact with the diaphragm.

7. The valve as in claim 2 wherein the flow diverter is in an exhaust position and the raised element is spaced a distance away from the retaining wall.

8. The valve as in claim 2 wherein the flow diverter is in an exhaust position and the length of a solid peripheral wall at the open end portion is at least as long as a longitudinal gap, (G2), between the diaphragm and a sidewall of the cavity.

9. The valve as in claim 1, wherein the flow diverter is in a delivery position and the openings between the plurality of longitudinal members allow communication between the supply passage and the delivery passage.

10. The valve as in claim 1, wherein the diameter of the flow diverter at the closed end portion ranges from about 90% to about 99% of the diameter of the cavity.

11. The valve as in claim 1 wherein the length of the flow diverter ranges from about 70% to about 99% the length of the cavity.

12. The valve as in claim 1, wherein a diameter of the recessed wall at the open end portion is less than a diameter of an outer surface of the plurality of longitudinal members at the closed end portion.

13. A method of controlling air flow in a brake valve comprising: passing air through a delivery passage of the brake valve and into contact with a raised element of a flow diverter disposed within a cavity of the brake valve; moving the flow diverter within a cavity of the brake valve toward an exhaust position wherein a recessed wall of the flow diverter is seated against a diaphragm of the brake valve; passing the air through an exhaust passage of the brake valve; passing air from a supply passage of the valve and into contact with a ledge and the recessed wall of the open end portion of the flow diverter; moving the flow diverter toward a delivery position within the cavity of the brake valve away from the diaphragm; and passing the air through a delivery passage of the brake valve.

14. The method as in claim 13, wherein the flow diverter is in an exhaust position and air pressure at the delivery passage is greater than the air pressure at a supply passage.

15. The method as in claim 13, wherein the flow diverter is in the exhaust position and air flow from the delivery passage to the supply passage is restricted.

16. The method as in claim 13, wherein the raised element comprises a base, a top surface and a wall therebetween.

17. The method as in claim 16, wherein the wall is oriented at an angle, alpha, of at least about 90 degrees relative to the base.

18. The method as in claim 13, wherein the flow diverter is moved to the delivery position within the cavity and is seated against the retaining wall of the brake valve.

19. The method as in claim 13, wherein the flow diverter is in the delivery position and the air pressure at the supply passage is greater than the air pressure at the delivery passage.

20. The method as in claim 13, wherein passing air from the supply passage comprises passing air through the open end portion of the flow diverter, along a longitudinal axis of the flow diverter and radially outward through openings between a plurality of longitudinal members of the flow diverter to the delivery passage, wherein the ledge is between the recessed wall and the longitudinal members.

* * * * *